United States Patent [19]

Payne et al.

[11] Patent Number: 5,096,969

[45] Date of Patent: Mar. 17, 1992

[54] LENS BLOCKING MATERIAL COMPOSITION

[75] Inventors: John W. Payne, Treasure Island; Charles J. Duffy, Jr., Seminole, both of Fla.

[73] Assignee: Icare Industries Incorporated, St. Petersburgh, Fla.

[21] Appl. No.: 620,468

[22] Filed: Nov. 30, 1990

[51] Int. Cl.$^5$ .................. C08L 23/08; C08L 31/04
[52] U.S. Cl. ........................... 525/222; 51/216 LP
[58] Field of Search ........................... 525/222

[56] References Cited

U.S. PATENT DOCUMENTS

| | | | |
|---|---|---|---|
| 3,911,185 | 10/1975 | Wright | 525/222 |
| 3,914,489 | 10/1975 | Smedberg | 525/222 |
| 3,926,878 | 12/1975 | Shimiyu et al. | 525/222 |
| 4,352,749 | 10/1982 | Nakabayashi et al. | 525/222 |

OTHER PUBLICATIONS

Petrolite Corporation Brochure-VYBAR ® Polymers-1982, pp. 1 & 8.
Hercules Bulletin R-272A-Tech. Information for the Adhesives Industry-Piccotac ® B Aliphatic Hydrocarbon Resin (9-88), pp. 1-3.
DuPont Brochure-Eluax Resins-6/89-pp. 1-8.
Renfrew-Polythene-1957-p. 242.

*Primary Examiner*—Carman J. Seccuro
*Attorney, Agent, or Firm*—Cushman, Darby & Cushman

[57] ABSTRACT

A blocking material composition, an essentially homogeneous mixture of
(a) 80-90 weight percent of an ethylene derived hydrocarbon polymer having a molecular weight of 2600, a melting point of 51° C. and a density of 0.79 g/cc at 93° C.,
(b) 10-15 weight percent of a thermoplastic, low molecular weight aliphatic hydrocarbon resin derived from mixed monomers of petroleum origin having a softening point of 98°-102° C., a specific gravity of 0.948 at 25° C., an acid number <1, a molecular weight of 1895 and
(c) 1-3 weight percent of an ethylene/vinyl acetate copolymer having a vinyl acetate content of 18 percent by weight, a melt index of 150 g/10 min, a density of 937 g/cm$^3$ at 23° C. and a softening point, ring and ball, of 99° C. Also disclosed is a lens block of the blocking material and method for securing an ophthalmic lens to one surface of a lens block by applying to one surface of said lens block a molten blocking material composition.

5 Claims, No Drawings

LENS BLOCKING MATERIAL COMPOSITION

FIELD OF INVENTION

This invention relates to a blocking material composition for use in adhering an ophthalmic lens to a lens block employed with conventional machining, grinding and processing equipment in the generation of ophthalmic lenses.

BACKGROUND OF THE INVENTION

The process of preparing optical or ophthalmic lenses begins with an unfinished or semi-finished glass or plastic lens blank. Typically a semi-finished lens blank has a finished polished front surface and an unfinished back surface. By grinding away material from the back surface of the lens blank the required corrective prescription is generated. Thereafter, the surface having had the corrective prescription imparted thereto is polished and the peripheral edge of the thus processed lens blank is provided with a final desired contour thereby establishing a finished optical or ophthalmic lens.

It is necessary during these various processing operations to securely maintain the lens blank in accurate alignment and in place on the lens block.

Heretofore various materials were employed to secure the lens blank to the lens block. These materials include glues, pitch and low temperature fusible metal alloys. The use of glues and pitch, in addition to being messy, suffers the further disadvantage of generally being non-reusable or non-reclaimable. While the prior art use of low temperature metal alloys eliminated some of these disadvantages experienced with the use of glues and pitch, nonetheless, the use of these metal alloys, both in their preparation and their reclamation caused significant environmental and health hazards especially since these alloys were most often fabricated from such metals as cadmium, tin, lead and bismuth. Of these metals, lead and cadmium are the most toxic. Lead is strong protoplasmic poison and can be introduced into the body by ingestion, inhalation and skin absorption. Cadmium poisoning is similar to lead in many ways and is introduced into the body in the same way as lead. Like lead, cadmium is stored in the liver, kidney and bone. Procedures for the formulation of such alloys and reclamation processes so as to enable its re-use as a material to secure a lens blank to a lens block thus exposes workers to serious environmental and health hazards. The formation of these alloys often is accomplished through the use of powdered or particulate metals which are subjected to a sintering and heat treating process. Fumes and/or dust particles of these metals are released to the ambient atmosphere thereby creating environmental and health hazards for those formulating these alloys. The same hazards exist for those attempting to reclaim the used low temperature metal alloy blocking material.

To overcome the disadvantages associated with the use of low temperature metal alloys in the field of generating ophthalmic lenses the applicants have now developed a new low shrinkage, relatively low cost blocking material composition.

DETAILED DESCRIPTION OF THE INVENTION

The novel blocking material composition of the present invention comprises an essentially homogeneous mixture of (a) 80-90 weight percent of an ethylene derived hydrocarbon copolymer having a molecular weight of 2600, a melting point of 51° C., a viscosity of 104 centipoises at 149° C. and a density of 0.79/cc at 93° C., (b) 10-15 weight percent of a thermoplastic, low molecular weight aliphatic hydrocarbon resin derived from mixed monomers of petroleum origin, having a softening point of 98°-102° C., a specific gravity of 0.948 at 25° C., an acid number <1, a molecular weight of 1895 determined by gel permeation chromatography and a melt viscosity at 10 poises of 160° C.; and (c) 1-3 weight percent of an ethylene/vinyl acetate copolymer having a vinyl acetate content of 18 percent by weight, a melt index of 150 g/10 min., a density of 937 g/cm$^3$ at 23° C. and a softening point, ring and ball, of 99° C.

The novel blocking material of the present invention can also include an antioxidant such as butylated hydroxy toluene in an amount required to give a concentration of about 0.1% by weight (1000 ppm) in the final blend although lesser or greater amounts can be employed if desired or appropriate.

In a preferred embodiment of the present invention the novel blocking material composition consists of 85 weight percent of the ethylene derived hydrocarbon resin (a), 13 weight percent of the thermoplastic low molecular weight aliphatic hydrocarbon resin (b) and 2 weight percent of the ethylene/vinyl acetate copolymer (c).

To produce a melted blend conventional blending equipment can be employed. For instance, a jacketed vessel provided with spaced apart baffles, running the full depth of the vessel, and agitator means can be used. The baffles, of course, prevent build-up of the blocking material components in the corners between the vessel wall and the baffles.

After introducing the above defined blocking material components into the jacketed vessel, the agitator, such as a bladed open turbine with blades pitched 45° to pump down toward the bottom of the vessel, is actuated.

The jacketed and insulated vessel is then heated while mixing the blend's components to a temperature of about 163° C. for about 30 minutes. Heating can be accomplished by conventional means such as hot oil, steam or electrical heating, care being taken to prevent scorching or thermal degradation of the blend ingredients.

Alternate mixing techniques can be employed such as, for instance, a vessel commercially available under the trade designation "Mixer-Emulsifier" from Charles Ross & Son Co., Hauppauge, N.Y.

After producing the hot melt blend in the mixing vessel the contents thereof are cooled and formed into cylindrical or diced pellets by conventional means. Conventional strand pelletizers that can be employed are designed to cut a large number, i.e. 20-100, of continuous strands into uniform cylindrical pellets by means of rotating knives operating against a stationary bed knife. Alternatively, commercial dicers can be employed which are designed to cut sheet stock into small, uniform cubes. Sheet stock can be produced by extruding the molten blend from the vessel through a pump- or gravity-fed slit orifice onto a stainless steel belt and directing a water spray against the underside of the belt to cool and solidify the melt. The sheet can be picked off the belt by a doctor blade and fed into the dicer.

Pelletization can also be accomplished by means of underwater die-face cutters which employ rotating knives that cut across the face of the extruder die as the molten material is forced out.

In use one surface, generally a concave surface, of a lens block is held in spaced relationship to, generally, the convex surface of a lens blank thereby defining a blocking material receiving cavity. The blocking material composition of the present invention is then applied to the said surface of said lens block receiving the lens blank by injecting the blocking material, heated to a temperature of about 60° C. into the said cavity using, for instance, a conventional hand pump or any other conventional hot melt pumping or delivery means.

An alternative use of the blocking material composition of the present invention involves the fabrication of a lens block employing, for instance, a device for securing a lens block, comprising a solidified mass of the blocking material of the present invention, to a lens blank, such as described in U.S. Pat. No. 3,468,366 to J. M. Suddarth, the disclosure of which is incorporated herein by reference.

While the present invention has been described with reference to preferred embodiments, obviously modifications and alterations will occur to others upon the reading and understanding of this specification. It is however the applicants intention to include all such modifications and alterations insofar as they come within the scope of the appended claims or the equivalents thereof.

We claim:

1. A blocking material composition for use in generating an optical lens from a lens blank comprising an essentially homogeneous mixture of
   (a) 80–90 weight percent of an ethylene derived hydrocarbon polymer having a molecular weight of 2600, a melting point of 51° C., a viscosity of 104 centipoises at 149° C. and a density of 0.79 g/cc at 93° C.,
   (b) 10–15 weight percent of a thermoplastic, low molecular weight aliphatic hydrocarbon resin derived from mixed monomers of petroleum origin having a softening point of 98°–102° C., a specific gravity of 0.948 at 25° C., an acid number <1, a molecular weight of 1895 determined by gel permeation chromatography and a melt viscosity at 10 poises of 160° C., and
   (c) 1–3 weight percent of an ethylene/vinyl acetate copolymer having a vinyl acetate content of 18 percent by weight, a melt index of 150 g/10 min, a density of 937 g/cm$^3$ at 23° C. and a softening point, ring and ball, of 99° C.

2. The blocking material composition of claim 1 wherein said ethylene derived hydrocarbon polymer (a) is present in an amount of 85 weight percent, based on the total weight of said composition, said thermoplastic low molecular weight aliphatic hydrocarbon resin (b) is present in an amount of 13 weight percent, based on the total weight of said composition and said ethylene/vinyl acetate copolymer (c) is present in an amount of 2 weight percent, based on the total weight of said composition.

3. The blocking material composition of claim 1 in dry, particulate form.

4. A lens block comprising a solidified mass of a blocking material composition comprising an essentially homogeneous mixture of
   (a) 80–90 weight percent of an ethylene derived hydrocarbon polymer having a molecular weight of 2600, a melting point of 51° C., a viscosity of 104 centipoises at 149° C. and a density of 0.79 g/cc at 93° C.,
   (b) 10–15 weight percent of a thermoplastic, low molecular weight aliphatic hydrocarbon resin derived from mixed monomers of petroleum origin having a softening point of 98°–102° C., a specific gravity of 0.948 at 25° C., an acid number <1, a molecular weight of 1895 determined by gel permeation chromatography and a melt viscosity at 10 poises of 160° C., and
   (c) 1–3 weight percent of an ethylene/vinyl acetate copolymer having a vinyl acetate content of 18 percent by weight, a melt index of 150 g/10 min, a density of 937 g/cm$^3$ at 23° C. and a softening point, ring and ball, of 99° C.

5. The lens block of claim 4 wherein said ethylene derived hydrocarbon polymer (a) is present in an amount of 85 weight percent, based on the total weight of said composition, said thermoplastic low molecular weight aliphatic hydrocarbon resin (b) is presenting an amount of 13 weight percent, based on the total weight of said composition and said ethylene/vinyl acetate copolymer (c) is present in an amount of 2 weight percent, based on the total weight of said composition.

* * * * *